July 7, 1970   R. A. CARDNO ET AL   3,519,362
GLASS COLOR STREAK DETECTOR INCLUDING A FLEXIBLE
BACKGROUND MATERIAL BIASED AGAINST THE GLASS
Filed March 12, 1968
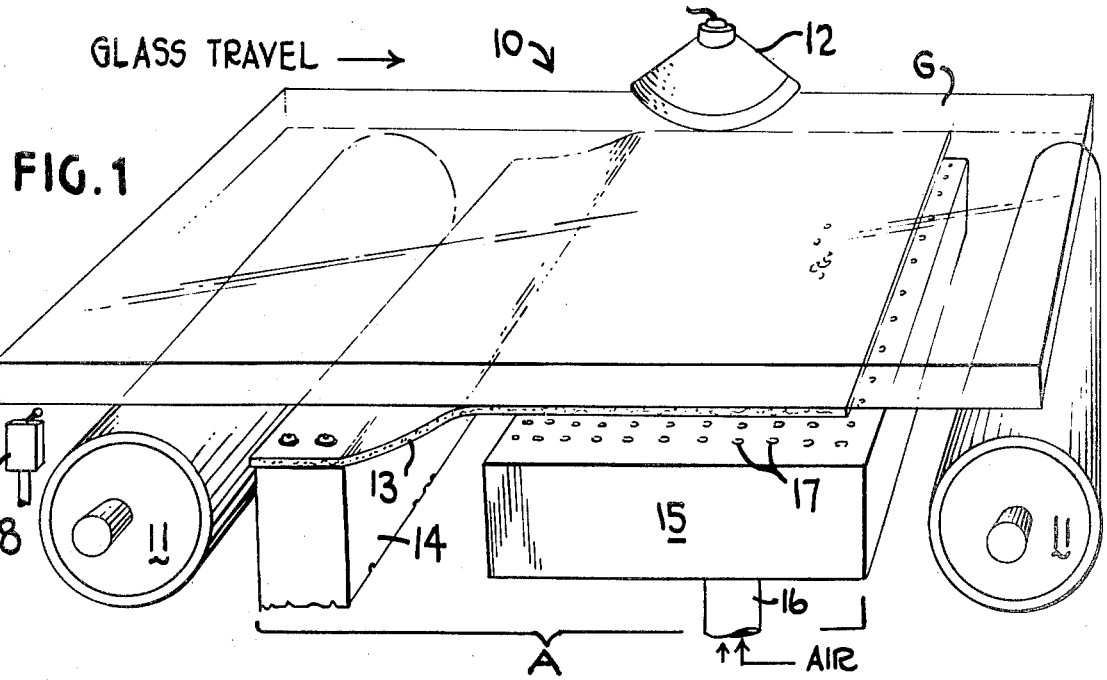
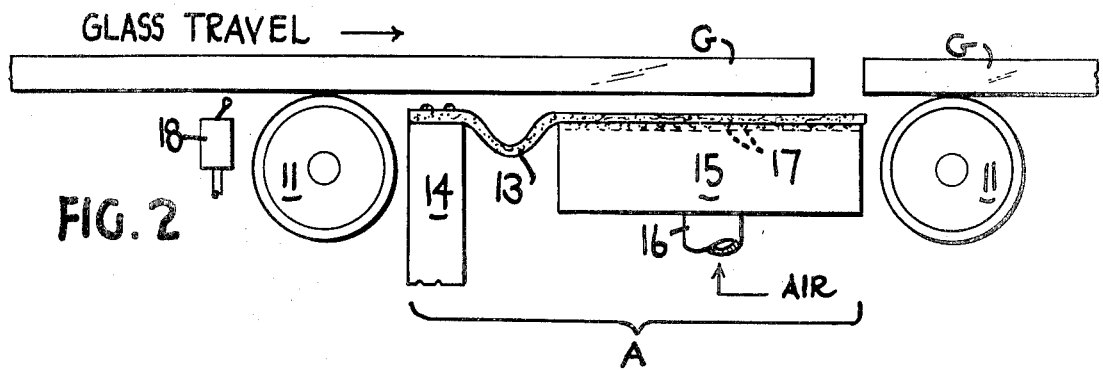
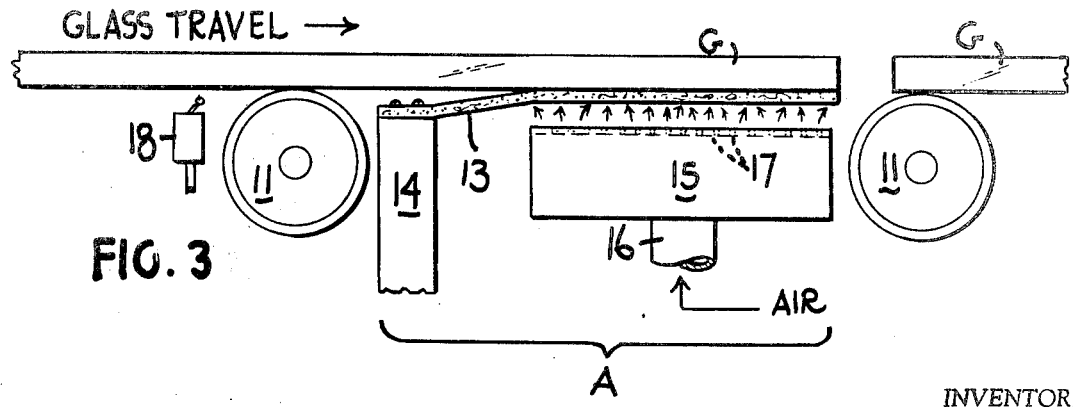
INVENTORS
RICHARD A. CARDNO &
MILTON J. HILL
BY Chisholm & Spencer
ATTORNEYS 3,519,362
GLASS COLOR STREAK DETECTOR INCLUDING A FLEXIBLE BACKGROUND MATERIAL BIASED AGAINST THE GLASS
Richard A. Cardno, Kittanning, Pa., and Milton J. Hill, Festus, Mo., assignors to PPG Industries, Inc., Pittsburgh, Pa., a corporation of Pennsylvania
Filed Mar. 12, 1968, Ser. No. 712,535
Int. Cl. G01n 21/16
U.S. Cl. 356—237                         4 Claims

ABSTRACT OF THE DISCLOSURE

A glass defect detection apparatus having a flexible backdrop positioned between the glass and an air table, with the backdrop being contacted to the moving glass by air pressure supplied from the table. The invention also includes a method of detecting defects in a glass sheet by contacting a contrasting background material to the glass, the material being intermittently contacted to the moving glass by air pressure.

---

This invention relates to apparatus and a method for the inspection of sheet or plate glass. In well-known processes for producing window or plate glass, a continuous sheet or ribbon of glass, after being formed, is carried horizontally through annealing leers or other treating station and emerges therefrom to other work stations to be cut into smaller sized sheets. Certain defects present in the glass materially affect the use of the glass, and also the cutting of ribbon into smaller sized sheets. Some defects present in the glass sheet are extremely difficult to detect, and can only be detected when a sheet is held in front of a background material. One of the defects most difficult to detect is known as a color streak or sometimes called an "amber spot." Presently such defects are usually undetected until after cutting, and result in rejection of the cut sheet.

Another method of detecting defects is to pass the glass over a white or colored background plate which is positioned close to the glass. Such apparatus is disclosed in U.S. 2,042,526 to Frederick R. Hohmann. This apparatus has certain disadvantages in that the continuously moving sheets of glass cannot be in intimate contact with the plate, because it has been discovered that the most efficient colored streak detection occurs when the background matter is in physical contact with the passing sheets. This invention permits physical contact between the background material and the sheet and it permits the easy and free passage of the glass-sheet. This invention provides a method and apparatus for efficient detection of defects by material contact between a moving glass sheet and a background material.

In the drawing:
FIG. 1 is a perspective view of the apparatus;
FIG. 2 is a schematic side view showing the back ground uncontacted to the glass;
FIG. 3 is a schematic side view showing the background contacted to the glass.

Referring now to the drawing, the letter "A" designates the improved glass inspection apparatus forming the subject matter of the present invention. A suitable inspection station "A" is included in conveyor line 10 having a plurality of rollers 11. The inspection station "A" is mounted between typical rollers 11. Moving glass sheets "G" are carried down the line and into the inspection station "A" area. The apparatus of the invention comprises: a light source 12 mounted above inspection station "A" and designed to pass light in a relatively narrow area beneath the source. A backdrop 13 of flexible material such as oilcloth, linoleum, or other material such as an opaque plastic, is mounted beneath the level of glass travel. The preferred material is white or light in color. A base 14 extends across the entire conveyor line and a backdrop 13 is anchored to this base. An air table 15 is positioned between the rollers 11. The flexible backdrop rests on the framework 15 when in the inactive position. A source of air pressure is connected to the air table 15, such as a pipe 16. The air table has a plurality of openings 17 positioned beneath the support framework and extends transversely of the line of glass travel. A limit switch 18 is used to respond to the passage of glass and to activate the air supply to table 15. In operation a piece of glass actuates limit switch 18, air is immediately supplied, under pressure, through pipes 16, and almost instantaneously elevates the flexible backdrop material 13 and contacts it intimately with the surface of the glass "G" moving over the table. The glass continues to move down the conveyor while the white material or backdrop is in contact therewith.

A piece of pipe having a plurality of air holes may be used in lieu of the air table.

The air support permits the continued forward movement of the glass and yet provides all of the benefits of the intimate contact between the backdrop and the glass surface which results in the improved detection of the defects in the glass. A typical installation is operated by a limit switch in conjunction with an actuating circuit or mechanism which controls the supply of air to the pipes. For larger and longer sheets of glass it is contemplated that an air support table be positioned beneath the glass to provide maximum contact with the backdrop.

The flexible backdrop and the actuated unit is mounted between conveyor rolls 11 with the top surface of the unit placed about 3/16 inch below the nip line of the conveyor rollers. A light source, such as a fluorescent light 12, is placed about 3 feet above the glass, and spanning the full width and length of the unit, produces a very accepted light source which is readily reflected from the backdrop material.

The detected defects are marked by an examiner or in some applications are detected by automatic equipment which scans the defects and this is then used as an input source for computer directed scoring and cutting equipment.

The apparatus and method disclosed herein are superior for color streak defect detection, while permitting the continued uninterrupted forward movement of the glass sheet.

What is claimed is:
1. Apparatus for aiding the detection of defects in a glass sheet which is disposed upon a conveyor line having a path of travel comprising: a flexible backdrop material disposed beneath the line of travel of said glass, means comprising a plurality of upwardly directed jets of fluid disposed beneath the backdrop for contacting said backdrop to the glass.
2. Apparatus for enhancing the ability to detect defects in a glass sheet which is disposed upon a conveyor line having a path of travel comprising:
(a) a flexible backdrop material disposed beneath the path of travel of the glass;

(b) air support means disposed beneath said flexible backdrop material to supply air under pressure whereby the backdrop is contacted to the moving glass.

3. A method of detecting defects in a glass sheet comprising:
 (a) positioning a flexible background material beneath the glass sheet;
 (b) directing a plurality of jets of fluid upwardly against said material to contact said material to said glass sheet.

4. A method of detecting defects in a glass sheet comprising:
 (a) disposing a flexible backdrop material between a glass sheet and an air support table;
 (b) actuating said air support table in response to the presence of the glass sheet;
 (c) contacting said material to said glass by supplying air under pressure to said material and moving said material to the glass sheet.

References Cited
UNITED STATES PATENTS

| | | |
|---|---|---|
| 1,956,165 | 4/1934 | Boggs et al. |
| 1,974,598 | 9/1934 | Boggs. |
| 2,042,526 | 5/1936 | Hohmann. |

RONALD L. WIBERT, Primary Examiner

O. B. CHEW II, Assistant Examiner